Figure 1:
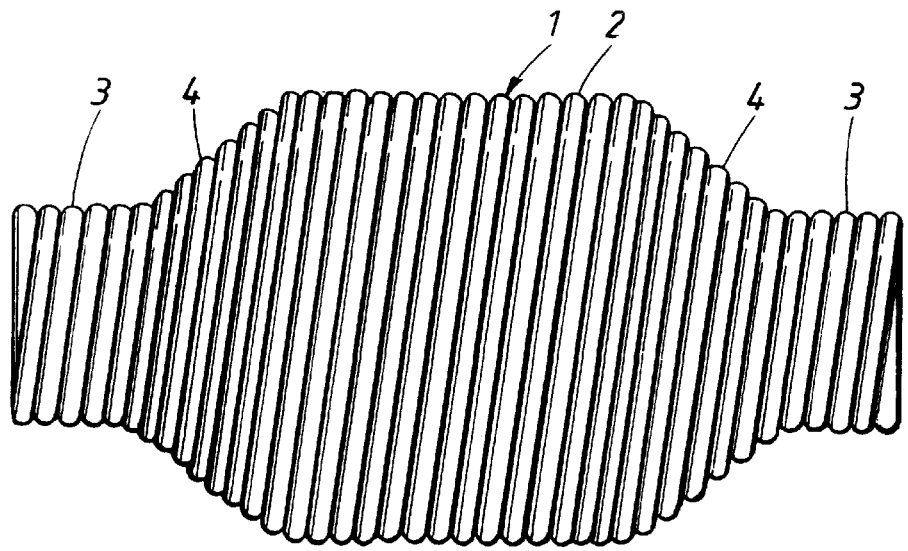

United States Patent [19]
Derman

[11] Patent Number: 6,062,157
[45] Date of Patent: May 16, 2000

[54] YIELDABLE TACKLE FOR TENSION ELEMENTS SUCH AS CABLES

[75] Inventor: Karl-Gustaf Derman, Harestad, Sweden

[73] Assignee: Ewes Stalfjader AB, Sweden

[21] Appl. No.: 09/066,351

[22] PCT Filed: Oct. 29, 1996

[86] PCT No.: PCT/SE96/01386

§ 371 Date: Jun. 25, 1998

§ 102(e) Date: Jun. 25, 1998

[87] PCT Pub. No.: WO97/16340

PCT Pub. Date: May 9, 1997

[30] Foreign Application Priority Data

Nov. 1, 1995 [SE] Sweden .................................. 9603849

[51] Int. Cl.[7] .................................................. B63B 21/00
[52] U.S. Cl. ...................... 114/230.24; 114/213; 267/74; 267/179; 267/180
[58] Field of Search ............................ 114/230.2, 230.24, 114/213, 215, 216; 267/69, 73, 74, 166, 179, 180

[56] References Cited

U.S. PATENT DOCUMENTS

| | | | |
|---|---|---|---|
| 836,811 | 11/1906 | Kennebrew | 267/73 |
| 1,385,919 | 7/1921 | Irwin . | |
| 1,509,012 | 9/1924 | Whiting | 114/215 |
| 1,589,697 | 6/1926 | Howd | 267/73 |
| 2,924,448 | 2/1960 | Nantz | 267/74 |
| 3,126,860 | 3/1964 | Shepperton | 114/230.24 |
| 4,864,956 | 9/1989 | Onstwedder, Jr. . | |
| 5,307,753 | 5/1994 | Besonen, Sr. et al. . | |

FOREIGN PATENT DOCUMENTS

| | | |
|---|---|---|
| 0255281 A2 | 2/1988 | European Pat. Off. . |
| 3112050 C2 | 6/1983 | Germany . |

*Primary Examiner*—Sherman Basinger
*Attorney, Agent, or Firm*—Smith, Gambrell & Russell, LLP Beveridge, DeGrandi, Weilacher & Young

[57] ABSTRACT

A spring apparatus for use with hauling elements such as mooring ropes. The apparatus has a spring element (1) in the shape of a tension screw spring which has an intermediate section having a diameter considerably larger than that of its end sections (3). A certain predetermined maximal tension load, and a certain predetermined maximal stretch of the spring element are positioned at the intermediate portion, which, due to its larger diameter, has a lower spring constant, while the end-sections with their smaller diameters and larger spring constants are not stretched. The apparatus also comprises an attachment element (6) attached to an end section and preferably attachment elements attached to each of the end sections. The attachment elements are designed to hold sections of the hauling elements (10). In addition, the hauling element acts as a stretch limiter which prevents the spring from being deformed by overload.

15 Claims, 2 Drawing Sheets

YIELDABLE TACKLE FOR TENSION ELEMENTS SUCH AS CABLES

TECHNICAL FIELD OVER THE INVENTION

The present invention relates to a spring means for hauling elements, such as ropes, especially ropes for anchoring boats.

RELATED ART

Elements which are exposed to tractive forces, such as ropes, chains, and pull-rods, are often equipped with a spring means to equalize the large forces which might occur if the element is exposed alternately to load removal and severe wrenching. Load removal which alternates with wrenching particularly occurs in moorings for boats and floating bridges due to movements of the water. If there is no elasticity in the force absorbing system, the wrenching can lead to forces so large that the mooring element, usually a rope or a chain, is torn or that its attachment is torn off.

For this reason it is common to equip such hauling elements with a spring means. A number of such spring means are known. A common spring means comprises a screw spring, which, through links which overlap each other, absorbs the wrenching as compressive forces. However, this kind needs a considerable amount of space, and also has a tendency to be noisy. Another known kind is in the shape of a rubber strap, which additionally has a safety device, due to the fact that the mooring line is wound about it at the same time as it is fastened to the outer ends of the strap. In this way it is possible to utilize the resilience of the rubber, while the unbroken rope ensures that the mooring does not break if the strap breaks due to material exhaustion. This device is handy to use, and has a small diameter, but its production costs are relatively high. There are also other kinds of such spring means, which might have other disadvantages. A common problem is how to attach the hauling element to the spring means in a safe way which is also easy to handle.

SUMMARY OF THE INVENTION:

The present invention uses a tension screw spring for the spring function, an element which can be produced in special machines without any large tool costs. The particular characteristics of the invention, a tension screw with two different diameters, a large diameter at the intermediate section, and a smaller diameter at the two end-sections, the springing movement between the turns of the spring can be positioned to the intermediate section while the two end-sections, which due to their smaller diameter have a larger spring constant, are not affected. Due to this fact, they can be used as attachment points for the hauling element.

THE DRAWINGS

Figure 2:
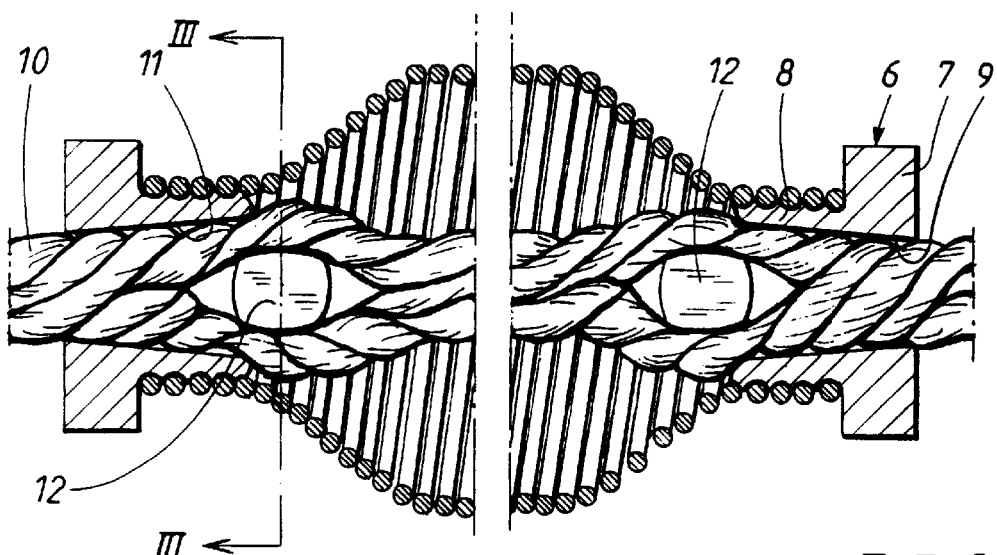
Figure 3:
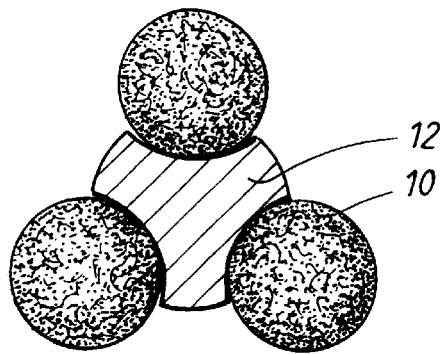
Figure 4:
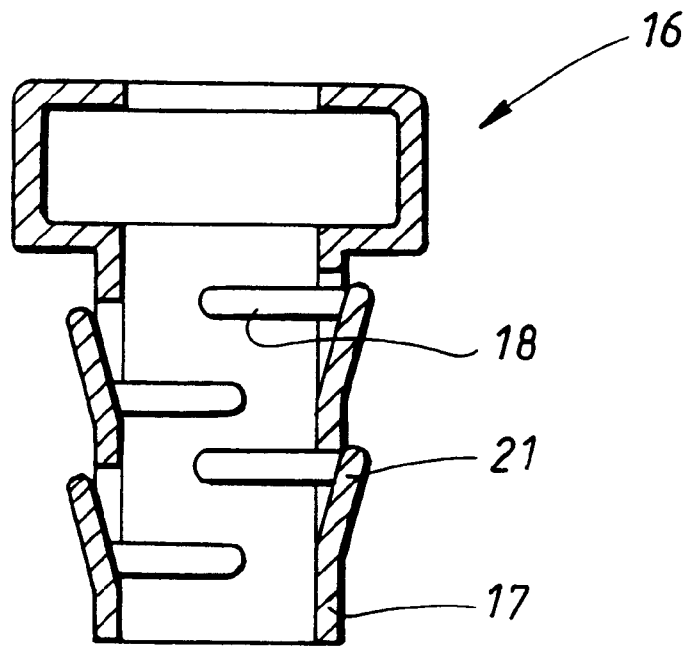

In the following, the invention will be shown in a number of embodiments which are shown in the Figures:

FIG. 1 a view of an embodiment of a spring element;

FIG. 2 a cross section of the spring means, which shows the attachment of the hauling element, a rope, to the ends of the spring element;

FIG. 3 a cross section of a detail of said attachment;

FIG. 4 a cross section of a second embodiment of said attachment, and

Figure 5:
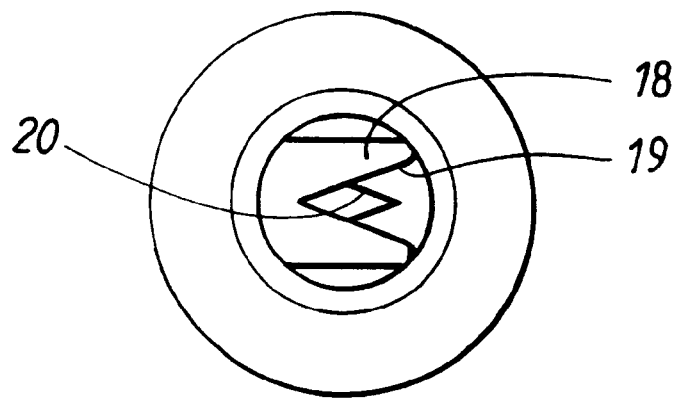

FIG. 5 an end view of this attachment.

PREFERRED EMBODIMENTS

FIG. 1 shows how a main element of the spring means, from now on referred to as spring element 1, is made as a tightly wound screw spring with two diameters. The intermediate section 2 of the spring element has a considerably much larger diameter, here shown in double size, compared to the end-section 3 at both ends, which both connect to the intermediate section via conically wound sections 4.

The spring wire of the windings of the spring element is assumed to have an even thickness, and is here shown with a circular cross-section although other cross-sections are not excluded. The material is assumed to preferably be hardened steel, either stainless or equipped with some sort of rust protection. In certain applications, however, other alternate materials can be used.

The spring element 1 is arranged to work as a draw spring. In case of tension load, it will stretch, since the wire turns will be bent out from each other, and the stretch which is achieved at a certain load depends on the so-called spring constant. The value of the spring constant in turn depends on material quality, the dimensions of the wire and the diameter. If all other conditions are equal, the stretch will increase at a certain load in proportion to the diameter of the spring.

This means that the stretch along the intermediate section 2 at a certain load will be larger than at the end-sections 3. In an embodiment for a certain maximum load, alternatively a maximal extended length, it is possible to position, by means of an adapted dimensioning, the entire stretching to the mid-section, possibly to some extent also to the conical sections, while the end-sections with the smallest diameters are not affected at all. The stretching can be affected not only by choice of material and dimensions, but also through pre-stressing of the spring during the winding. This means that the spring wire is curved in, towards the immediately preceding wire turn, which will cause the turns to contact each other with a certain initial force. This must first be overcome before the spring begins to stretch. By pre-stressing, the stretch can thus be affected, and also adapted in different ways in different sections of the spring.

The purpose of having different stretch in different sections of the spring or, more precisely, of positioning the entire stretch within the intended maximum load to the mid-section without any stretch of the end-sections, is to enable these to be used as attachment points for the hauling element, usually a rope. Such use is hardly possible if these sections of the spring element were also to be exposed to stretch with the spring turns being separated from each other. Since the spring has been given a stable shape in these attachment sections, the spring turns can be used as a nut thread, or in some other way using attachment elements which are inserted into the end-sections. These can of course alternatively, or at the same time, be used as screw threads for elements which are attached on the outside of the end sections.

In the following, two embodiments of attachment elements will be described. FIG. 2 shows a central section of the spring means which has been shortened in order to save space. The spring element 1 can be seen with its mid-section 2 and the end-sections 3. The two attachment elements with the numeral 6 consist of an outer head 7, and a preferably slotted screw part 8, which is equipped with threads which have been adapted so that they can be screwed into the spring turns of the end-sections. A bore 9 extends through the element 6, which bore has been dimensioned to allow the hauling element to be drawn through it, here shown with a rope with the numeral 10. The bore 9 is conical, with an angle which is smaller than the friction angle, and which has its wider end at the end 11 of the element.

The rope 10, as shown, has end-sections which extend outwardly from the spring means and which are to be attached to the objects which are to be connected via the spring means; for example one end can be attached to a bridge and the other part to a boat which is to be moored. The two sections must thus be held in place by the spring means. However, the rope is also used as a stretch limiter for the spring means, so that it can not be deformed by overload and at the same time the rope provides a safety in case the spring element or the rope attachments break. Correctly adapted, the stretch limiter also ensures that the stretch is limited to the mid-section.

This is achieved by letting the rope extend through this spring means without interruption, but with an adapted extra length relative to the length of the spring means. This extra length allows a preset stretch before the rope inside the means is stretched, but does not allow this stretch length to be exceeded. Correctly adapted, this stretch limiter also ensures that the stretch does not become so large that it is not confined to the mid-section. Said extra length is shielded, for example from hooking, inside the spring element.

Holding of the rope in the attachment element 3 is achieved by stop elements 12. According to FIG. 3, these consist of short bodies with a star-shaped cross-section, with an amount of ribs and recesses respectively, which is equal to the amount of strands of the intended rope. During assembly of the stop element, the strands are separated and the stop element is inserted between them, as shown in FIG. 3. This gives such a large total cross-section where the stop element is, that the rope can not be pulled out through the bore 9. A lock which prevents the stop element from moving along the rope is achieved by the conical section 11, which presses the strands against the stop element and prevents it from sliding. Since the bore 9 is conical with an angle which is smaller than the friction angle, the rope with the stop element does not strive to slide out of the bore towards its wider end. The relatively long cone makes it possible to use attachment elements of a preset dimension for ropes of different diameter. By slotting of the attachment element, this adaptation to alternative dimensions can be made even wider.

During assembly of the rope, it is first drawn through the spring element 1 with the attachment elements 6 screwed out. The rope extends through the spring element, and the two stop elements 12 are now inserted between the strands of the rope at a prescribed distance from each other, which distance is chosen so that said stretch limiter for the spring means reaches a suitable value. After this, the attachment elements 6 are slipped on to the rope, one from each side and are screwed into each end-section 3, with the rope with the assembled stop elements between them, as shown in FIG. 2.

FIGS. 4 and 5 show a different embodiment of the attachment element. In this embodiment, the rope is held by the attachment element as such. The attachment element, here given the reference numeral 16, has a tube-shaped section 17 into which abut four flanges 18, provided with wedge-shaped threads. These threads overlap each other as shown in FIG. 5, so that only a narrow rhomboid-shaped throughbore 20 remains. These have a smaller cross-section than the intended rope, which must thus run in zigzag between the flanges 18 and, when stretched, the rope is pressed downwards towards the bottom of the threads. In this way the rope is secured against wrenching through the attachment element.

In order to attach the attachment element 16, this ought to be provided with an external thread. However, since the rope is held relatively firmly and can not twist, a screwing from both sides of the attachment element would cause a twisting of the rope, which could cause problems. For this reason, at the shown attachment elements, there is instead a snap attachment using protruding parts 21, which lean in such a way that they will spring inwards when the attachment elements are pressed into the end-section of the spring element, but will spring outwards between the wire turns with a transversal surface which makes it very difficult to pull the rope out. At its outermost end, the attachment element 16 has a head 22.

The invention is not limited to these two embodiments of attachment elements; other embodiments are possible which cooperate with the stable wound end-sections of the spring element. The shown attachment elements are adapted to be used together with a rope. If, however, it is desired to use other hauling elements such as a chain, or a stay, the attachment elements must be shaped for attachment to those kinds of hauling elements.

The spring element 1 can also have different embodiments. It can, for example, be sparsely wound to allow drainage of incoming water. It can also be equipped with some kind of housing, for example in rubber or plastic, and can be in the shape of a bellows.

It should be added that the thread, which the end-sections form, can be used in other ways than for the holding of the attachment organ of the hauling element. For example, several spring elements can be connected using a double-screw, if one wishes to have a longer spring length than can be offered by a device of a certain size. It is also possible to connect several spring elements in parallel, using bridges equipped with screws, so that a higher spring resistance is obtained. If one wishes only a section of the hauling element which extends outwards from the spring means, its other end can be attached directly in, for example, a fixed structure using one of the end sections.

What is claimed is:

1. Spring means for a hauling element, comprising: at least one spring element (1) in the shape of a tension screw spring, which is wound so that, at an intermediate section (2) of said spring element, said spring element has a larger cross-section than that of windings at end-sections (3) of the spring element, and said end-sections (3), which have a smaller cross-section than the intermediate section (2), are wound in a mainly cylindrical shape, so that at a certain preset maximum tension load and at a preset maximal stretching length, respectively, a stretch region of the spring element is positioned at the intermediate section, which intermediate section has a lower spring constant due to a larger spring wind cross-section than that of the end-sections, while the end-sections, with smaller cross-section diameter and larger spring constant, are essentially not affected with regard to stretch, and said spring means additionally comprises an attachment element (6), for attachment with a hauling element section, which attachment element is arranged for attachment with one of said end-sections (3), and said attachment element having a reception bore which has a central bore axis that extends axially in a common direction with stretch elongation of said spring element and into which reception bore the hauling element section extends for attachment with said spring element.

2. Spring means according to claim 1, characterized in that the spring element (1) is wound with a pretension so that the stretch resistance of the end-sections (3), which have a smaller cross-section diameter, is increased additionally due to the pretension, in addition to being affected by the pretension of the intermediate section (2), which has a larger cross-section.

3. Spring means according to patent claim 1, characterized in that there are a pair of attachment elements (6) with each having a thread portion which is dimensioned for threaded engagement with an end section using winding turns of said spring element as corresponding threading means.

4. Spring means according to patent claim 1, characterized in that the attachment element (6) has a stop part (23), arranged for stopping cooperation with winding turns of the spring element (1), to lock the attachment element against being drawn out of a respective one of said end-sections (3) of the spring element (1).

5. Spring means according to claim 1, further comprising a stretch limiter extending within said spring element.

6. Spring means according to claim 5, characterized in that there are a pair of attachment elements each with a reception bore defining a through-hole, and said stretch limiter is formed by the hauling element which extends through and continuously between the bores of said attachment elements and wherein said spring element has a length resulting in the hauling element having an extra length with respect to the distance between the attachment elements in a spring means not subjected to load.

7. Spring means according to patent claim 6, characterized in that each reception bore (9) includes a section that has a substantially common diameter as that of the hauling element extending therethrough, and in that a locking body (12) is arranged and sized so as to preclude withdrawal of the locking body and a portion of the hauling element in contact with the locking body through the bore of a corresponding one of said attachment elements.

8. A mooring device for mooring a boat comprising:
 a spring element having a shape of a wound tension coil spring, said spring element having opposite end portions and an intermediate portion therebetween, said end portions being substantially stretch resistant while said intermediate portion being stretchable under loads applied to the spring element;
 a mooring line extending internally through said spring element;
 attachment elements connecting said mooring line to each of said end portions; and
 a stretch limiter limiting to a predetermined value the amount of stretch the intermediate portion can undergo under load.

9. A spring apparatus for a mooring line comprising:
 a spring element in the shape of a tension coil spring wound from a wire, said spring element having opposite end portions and an intermediate portion located therebetween, said end portions being of substantially cylindrical shape and having wire turns forming threads, said end portions further having cross sections smaller than a cross section of said intermediate portion; and
 attachment elements for connecting said mooring line to each of said end portions, said attachment elements having threads for engaging the threads of said end portions, said attachment elements further having a bore for allowing said mooring line to extend through said attachment elements and internally through said spring element.

10. The spring apparatus of claim 9, wherein said spring element is wound with a pretension, so that stretch resistance of said end portions is increased.

11. The spring apparatus according to claim 9, further comprising a star-shaped body having ribs and recesses, said body placed on said mooring line and intertwined therewith, such that said mooring line together with said body has a diameter so large that said mooring line cannot be pulled out through said bores.

12. A Mooring device for mooring a boat, comprising:
 a spring element in the shape of a wound tension coil spring, said spring element having opposite end portions and an intermediate portion therebetween, said end portions having a smaller cross-section than a cross section of said intermediate portion and having a substantially cylindrical configuration;
 a mooring line, said mooring line extending through said spring element; and
 attachment elements connecting said mooring line to said end portions, said attachment elements each having a bore through which said mooring line extends.

13. The mooring device according to claim 12, wherein said spring element is wound with a pretension so that stretch resistance of said end portions is increased.

14. The mooring device according to claim 12, wherein said attachment elements have stop parts which cooperate with the winding turns of the spring element to prevent said attachment elements from being drawn out of said end portions.

15. The mooring device according to claim 12, wherein said attachment elements have a threaded section adapted for threaded engagement with a corresponding one of said end portions.

* * * * *